(No Model.)
J. BOLICK.
WHEEL.
No. 443,232. Patented Dec. 23, 1890.
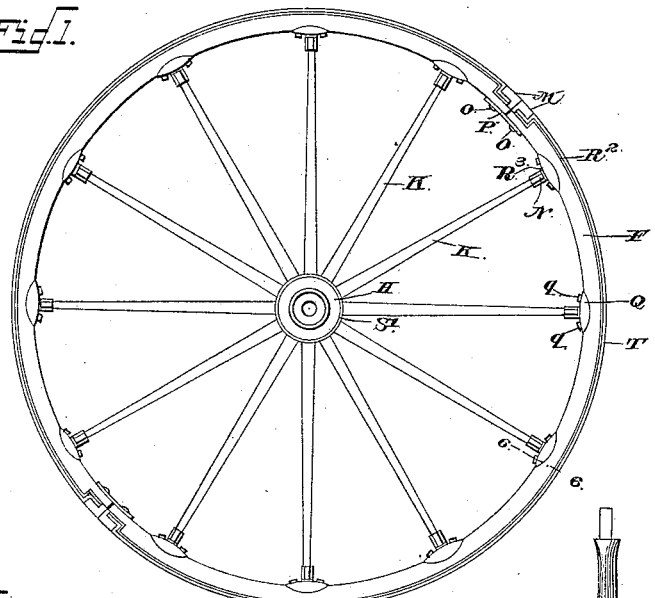
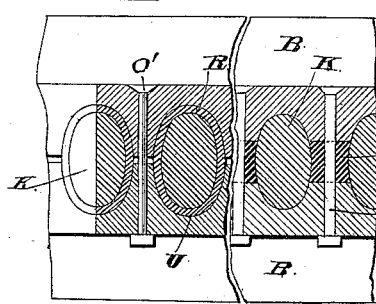
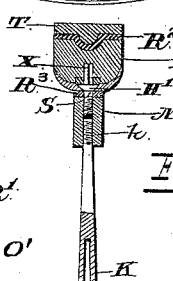
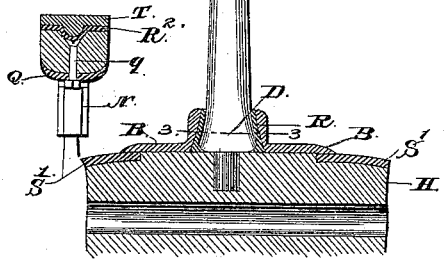
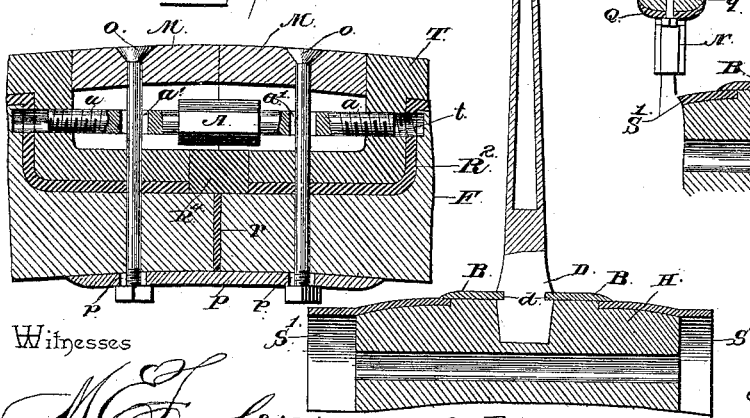
Witnesses
M. Fowler
N. L. Collamer
Inventor
Jerome Bolick
By his Attorneys,
C. A. Snow & Co.

UNITED STATES PATENT OFFICE.

JEROME BOLICK, OF CONOVER, NORTH CAROLINA.

WHEEL.

SPECIFICATION forming part of Letters Patent No. 443,232, dated December 23, 1890.

Application filed April 21, 1890. Serial No. 348,759. (No model.)

*To all whom it may concern:*

Be it known that I, JEROME BOLICK, a citizen of the United States, residing at Conover, in the county of Catawba and State of North Carolina, have invented a new and useful Wheel, of which the following is a specification.

This invention relates to carriages and wagons, and more especially to the wheels thereof; and the object of the invention is to provide new and improved means for connecting the inner ends of the spokes to the hubs, the outer ends of the spokes to the fellies, and the ends of the tire to each other.
To this end the invention consists in the specific details of construction hereinafter more fully described, and illustrated in the accompanying drawings, in which—

Figure 1 is a side elevation of a wheel embodying my improvements. Fig. 2 is a transverse section of the wheel and felly and longitudinal of the hub and spoke, this view showing one form of spoke which I use. Fig. 3 is an enlarged section on the line 3 3 of Fig.
5. Fig. 4 is an enlarged central longitudinal section of the connections between the ends of the tire. Fig. 5 is a longitudinal section of the hub, showing another form of spoke seated therein. Fig. 6 is a transverse section of the felly on the line 6 6 in Fig. 1.

Referring to the said drawings, the letter H designates a hub having sand-bands S', which may be of any ordinary or desired construction as is usual in this art.
K are the spokes of the wheel, seated at their inner ends in the hub and connected at their outer ends by the felly F, around which is the tire T, as will be understood. The spokes K are preferably of metal and may be of tapering tube, as shown in Fig. 2, or solid, as shown in Fig. 5, each of said spokes, however, having an enlarged head D at its inner larger end.

In the construction of spoke shown in Fig. 3 the head D is provided with notches $d$ in its opposite edges, and is slightly beveled on its opposite faces, said head being seated in a socket or tenon in the hub, as will be readily understood. In this position the several spokes stand close alongside each other at their inner ends, and the notches $d$ are flush with the outer face of the hub, and around said outer face at each side of the spokes is placed a ring or band B, whose inner edge engages the notches $d$ in the several heads D of the spoke, and whose outer edge laps over and upon the inner edge of the sand-band S', these two rings or bands B being shrunk upon the hub in the manner well known in carriage-making.

In the construction of spoke shown in Fig. 5 the enlarged head D is slightly oval in cross-section, as shown in Fig. 3, and the two rings or bands B are provided with U-shaped half-sockets U, which, when the bands are brought against the sides of the spokes and shrunk into place in the manner above described, complete a socket which tapers slightly outward, so as to form a dovetailed connection of the inner end of the spoke with the socket and hence with the hub. It will thus be seen that the socket completely surrounds the enlarged head of the spoke; but, as will be observed on an inspection of Fig. 3, the socket U is larger than the head and out of contact with it either entirely around the spoke, as shown at the left of said figure, or at the sides of the spoke which are next the next spoke, as shown at the right of said figure. In the space or spaces thus left vacant I seat a rubber collar or cushion R, as shown in these figures, and when the metallic sockets abut against the outer edges of the spokes I place rubber blocks R' between the adjacent faces of the spokes. Bolts O' are passed through the two bands B and also through the rubber blocks R', if they be used, between each two spokes, whereby the two parts of the sockets are held closer together and in contact with the spokes. The body of the spoke K (shown in Fig. 2) is preferably made tubular for a portion of its length, while that shown in Fig. 5 is preferably made solid, both being of metal.

At the outer end of the spoke I provide the same with a screw-thread $k$, and a screw S, having a head H, is provided, the threads of this screw being opposite to those upon the outer end of the spoke. A nut N, having double threads within, surrounds the threaded portions of the screw, and the spoke may be turned to adjust these parts longitudinally. To the inner face of the felly F, at suitable points, is secured a plate Q, bolts $q$ passing through the plate and through the felly, and their heads standing beneath the tire and beneath an interposed packing or ring, if one be used, as shown in Fig. 6. These plates Q are provided with countersunk holes, which receive the heads H of the screws S, and the said screws have each an angular extension X, which projects outwardly into a similarly-shaped hole in the felly, and thereby prevents the turning of the screw when the nut is turned.

A rubber ring R² is preferably inserted beneath the tire T and longitudinally grooved about, as shown in Fig. 2, and a rubber washer R is preferably also inserted between the nut H and the plate Q. With this construction of parts it will be obvious that when the nut is turned in the proper direction the screw S is drawn inwardly, carrying the plate Q with it, and that movement also draws the felly inwardly and tightens the same, as will be understood.

It will be seen that when the spokes are reduced in length to take up the shrinkage or wear that occurs in the several members of the felly the circumference of the wheel will be reduced, and hence the tire will be loosened.

In order to tighten the tire I have provided devices described below.

The ends of the tire where they meet are bent, as shown in Fig. 4, into a recess formed in the felly or between or at the meeting ends of the two members of the felly. The space thus left between the two sections of the tire is filled by metallic blocks M, of inverted-U shape cross-section approximately, whose outer ends abut against the shoulders of the tire-sections and whose inner ends abut against each other, as clearly shown in Fig. 4. The said shoulders are provided with threaded openings t, the threads of which are opposite to each other—that is to say, right and left—and between said shoulders is arranged a rod having right and left threads upon its ends a and an integral nut A at its center. It will be obvious that when this nut is turned in the proper direction the two tire members will be drawn closer together. The rubber ring R², which stands beneath the tire, follows closely behind and beneath the shoulders at the ends, and also along beneath the feet of the ends, as shown in this figure, and between the ends of the feet is inserted a rubber block R⁴ of considerable size. When the nut A is turned to draw the sections together, this block will of course be compressed. As these sections are drawn together the felly is of course reduced in circumference, and a rubber sheet r, which is normally placed between the ends of the felly-sections, is either replaced by a thinner sheet, removed entirely, or removed to allow the ends of the felly-sections to be sawed off and then replaced, and the screw-threaded ends a of the rod will eventually pass through the shoulders of the tire and into the ends of the felly-sections, as will be clear; but before the tire-sections can be drawn together the metallic blocks M must be removed, because they normally fill the space between the shoulders of the tire-sections. These blocks are therefore taken out, their meeting faces filed off for a sufficient amount, and then they are replaced. The openings in the bodies of these blocks are preferably of such shape that when the blocks are in their normal position the nut A will be held against rotation by its faces striking the inner walls of said openings. The blocks are held in place by bolts O, which pass through said blocks, through slots a' in the ends a, through holes in the feet of the tire ends and in the fellies, and through slots p in a plate P, which stands the meeting ends of the fellies at the inner sides thereof.

It will be understood that when the nut A is turned the plates N, tire-sections T, and fellies F are drawn together, the bolt O moving outwardly through the slots in the plate P and in the ends a. These bolts must, of course, be withdrawn in order to turn the nut A; but after the latter is turned and the plates P put in place, the bolts are reinserted, as will be clear.

Having thus described my invention, I claim—

1. In a wheel, the combination, with the hub, the felly, the spokes between them, and the plates at either side of the spokes, having sockets embracing the inner ends of the latter, of blocks of rubber between the inner ends of the adjacent spokes, substantially as described.

2. In a wheel, the combination, with the hub, the spokes seated therein, and the fellies connecting the outer ends of the spokes, of bands surrounding the hubs at each side of the series of spokes, sockets on the inner edges of said bands embracing the outer edges of the spokes, rubber blocks between the adjacent faces of the spokes, and bolts passing through the blocks between each two spokes, substantially as described.

3. In a wheel, the combination, with the hub, the spokes having screw-threaded outer ends, and the felly, of plates secured to the inner faces of the fellies and having countersunk holes therein, screws having enlarged heads seated in said holes, the shanks of said screws being threaded oppositely from the threads on the spokes, angular extensions above said heads fitting in holes in the felly, and nuts having opposite threads on their interiors engaging the adjacent ends of the spokes and screws, the whole operating substantially as described.

4. In a wheel, the combination, with the hub, the spokes having screw-threaded outer ends, the felly provided with a longitudinal groove in its outer face, and the tire having a longitudinal rib on its inner face fitting said groove through an interposed rubber ring, of plates seated against the inner face of the felly, bolts passing through the felly with their heads seated in countersunk openings in said groove therein and also passing through said plates near their ends, and connections, substantially as described, between said plates and the outer ends of the spokes, as set forth.

5. In a wheel, the combination, with the hub, the spokes, the felly-sections having recesses in their outer faces at their meeting ends, the tire-sections having shoulders and feet fitting the bottoms of said recesses, and the rubber ring between said felly and tire-sections, of a rubber block between the ends of said feet, a rubber sheet between the ends of the felly-sections, and means, substantially as described, for connecting the ends of the tire-sections and filling the spaces between their shoulders, substantially as described.

In testimony that I claim the foregoing as my own I have hereto affixed my signature in presence of two witnesses.

JEROME BOLICK.

Witnesses:
J. H. SIGGERS,
R. J. MARSHALL.